United States Patent [19]

Plaettner et al.

[11] 4,412,935

[45] Nov. 1, 1983

[54] STORAGE MATERIAL FOR HYDROGEN UTILIZING AMORPHOUS SILICON AND A METHOD FOR PRODUCING THE SAME

[75] Inventors: Rolf Plaettner, Ottobrunn; Wolfgang Krüehler, Unterhaching, both of Fed. Rep. of Germany

[73] Assignee: Siemens Aktiengesellschaft, Berlin & Munich, Fed. Rep. of Germany

[21] Appl. No.: 356,231

[22] Filed: Mar. 8, 1982

[30] Foreign Application Priority Data

Mar. 17, 1981 [DE] Fed. Rep. of Germany ....... 3110290

[51] Int. Cl.³ .................. C01B 33/04; B01J 20/10
[52] U.S. Cl. ..................... 252/188.1; 252/181.5; 252/184; 252/188.25; 423/248; 423/347; 252/188.31
[58] Field of Search .......... 252/188.1, 188.27, 188.26, 252/181.5, 184, 188.3 R; 423/248, 347, 644, 645, 648 R

[56] References Cited

U.S. PATENT DOCUMENTS 3,666,412  5/1972  Sowards ..................... 423/648 R
4,265,720  5/1981  Winstel ...................... 204/129

FOREIGN PATENT DOCUMENTS 2855413  7/1980  Fed. Rep. of Germany .

OTHER PUBLICATIONS

D. E. Carlson et al., "The Effect of Hydrogen Content on the Photovoltaic Properties of Amorphous Silicon", J. Electrochem. Soc.: Solid-State Science and Technology, vol. 126, pp. 688–691, (1979).
Pankovs Lampert and Tarng, Applied Physics Letters, vol. 32, No. 7, Apr. 1, 1978, pp. 439–441.
Pankovs, Applied Physics Letters, vol. 32, No. 12, Jun. 15, 1978, pp. 812–813.
Pankovs and Carlson, Applied Physics Letters, vol. 31, No. 7, Oct. 1, 1977, pp. 450–451.

*Primary Examiner*—Irwin Gluck
*Attorney, Agent, or Firm*—Hill, Van Santen, Steadman & Simpson

[57] ABSTRACT

A storage material for hydrogen comprised of amorphous silicon containing phosphorous, in addition to hydrogen (a-Si:H:P). In certain embodiments, such storage material is produced via a glow discharge plasma from a reactive gas mixture in accordance with a fluidized bed method or by quenching a phosphorous-doped silicon melt at a relatively high cooling rate. By admixing phosphorous with silicon, the absorption capacity of the resultant phosphorous-doped silicon material for hydrogen can be increased by a factor of 2 with the same production temperatures (200° C.). The storage material is useful in energy storage tanks (cheap and easily mass-produced).

10 Claims, 3 Drawing Figures

STORAGE MATERIAL FOR HYDROGEN UTILIZING AMORPHOUS SILICON AND A METHOD FOR PRODUCING THE SAME

BACKGROUND OF THE INVENTION

1. Field of the Invention

The invention relates to storage of hydrogen and somewhat more particularly to a material comprised of a amorphous silicon for storage of hydrogen and a method of producing such material.

2. Prior Art

With an increasing scarcity of fossil fuel, the development of new energy sources are gaining importance, among them, inter-alia, the regenerative energy sources. Hydrogen, as an energy source, has an advantage in that it is available in virtually unlimited quantities from water. With suitable handling, hydrogen is also a reliable and pollution-free fuel, which can readily release its energy through oxidation. A volume of 22.4 standard liters of hydrogen gas contains, in accordance with the reaction:

$$H_2 + 1/2O_2 \rightarrow H_2O + 68.3 \text{ kcal}$$

an energy quantity of 0.08 kWh.

For economical storage of large energy quantities, it is necessary to store hydrogen in a highly concentrated form so as to keep the storage volume as small as possible. It is also fundamentally important that the stored hydrogen be readily and reliably transportable. Because of the considerable proportion which non-rail traffic has of present fossil fuel consumption, there will also be a considerable significance attributed to hydrogen technology in future conveyance means (for example hydrogen tanks for motor vehicles equipped with a gas motor).

Storage of hydrogen under normal pressure, with the projected energy requirements, would require extremely large volumes, whereas present storage of hydrogen under high pressure (250 bar) in the form of large pressure bottles or tanks is impractical, expensive and dangerous. However, metal alloys are known which releasably absorb large quantities of hydrogen and thus can be utilized to store hydrogen. Best known examples of such alloys include ferro-titanium-hydride, $FeTiH_{1.7}$, magnesium-nickel-hydride, $Mg_2NiH_2$ and magnesium-hydride, $MgH_2$. The very heavy ferro-titanium-hydride releases hydrogen at 20° C. at a pressure of 1 bar, the lighter magnesium-hydride must be heated to 300° C. before it will release hydrogen. An ideal hydrogen storage material, which is lightweight and economical and which also releases absorbed hydrogen at relatively low temperature has not yet been discovered.

In solar cell technology, D. E. Carlson et al. in an article appearing in J. Electrochem. Soc., Solid-State Science and Technology, Vol. 126, (1979) pgs 689–691, suggests that thin layers of amorphous silicon can absorb up to 50 atomic percent hydrogen. The maximum absorption capacity of amorphous silicon (generally referred to as a-Si) for hydrogen will be above these values. However, the maximum hydrogen absorption capacity of a-Si has not yet been investigated in solar cell technology because relatively low concentrations of hydrogen are adequate for a-Si.

A safe and reversible storage and transportion of concentrated hydrogen with a storage medium comprised of amorphous silicon (a-Si) is described and claimed in commonly assigned German Offenlegungsschrift 28 55 413, which generally corresponds to U.S. Pat. No. 4,265,720. In accordance with these teachings, generally, hydrogen is stored in amorphous silicon which has been deposited in thin layers on a substrate material, such as quartz or steel.

SUMMARY OF THE INVENTION

The invention provides an improved material for safe and economical storage of hydrogen whereby:
 (a) storage of hydrogen in amorphous silicon is improved relative to storage capacity and the release of stored hydrogen is attained at relatively low temperature; and
 (b) methods are provided for economical production of such material in large quantities.

In accordance with the principles of the invention, amorphous silicon is produced so as to contain phosphorous therein, along with hydrogen.

The improved hydrogen storage materials of the invention is, in certain embodiments, produced by depositing a-Si:H:P via a glow discharge plasma, from a silicon-containing gas admixed with about 1 to 20% by volume of a phosphorous-containing gas. The deposition parameters are, in an exemplary embodiment, adjusted so that deposition occurs at a HF-power density in the plasma chamber on the order of magnitude of about 1 $kW/m^3$, a gas pressure of less than about 10 mbar and at temperatures less than about 200° C. Silicon-containing gases are preferably selected from the group consisting of silane ($SiH_4$), silicon tetrafluoride ($SiF_4$), silicon tetrachloride ($SiCl_4$), organic silicon-containing compounds and mixtures thereof. Phosphorous-containing gases are preferably selected from the group consisting of phosphorous hydride ($PH_3$), phosphorous halides, organic phosphorous compounds and mixtures thereof. The silicon-containing gases and phosphorous-containing gases are admixed with hydrogen to provide a reactive gas mixture. In an exemplary embodiment, the reactive gas comprises a uniform admixture of a silicon-containing gas and about 0.5 to 5% by volume of a phosphorous-containing gas, in addition to hydrogen.

In preferred embodiments of the invention, deposition of the improved hydrogen stored material of the invention proceeds according to a fluidized bed method whereby relatively larger storage material particles are separated from relatively smaller storage material particles by adjusting the velocity of a flowing gas stream within a plasma chamber so as to separate a desired particle size, with the so-separated larger particles being collected in a reservoir thereof and then removed from the reservoir with a hydrogen stream and fed to a storage container in a heap.

In another embodiment of the invention, the improved hydrogen storage material of the invention is produced by quenching molten silicon compounds doped with phosphorous at a cooling rate of about $10^{7°}$ K./s. In one form of this embodiment, doped molten silicon is sprayed onto a cooled impact plate rotating at a speed greater than about 30 m/s whereby a-Si:H:P accumulates as thin flakes, which are fed into a storage container in a dense heap. In another form of this embodiment, doped molten silicon is sprayed onto a cooled metal base positioned on a cylinder rotating at a speed greater than 30 m/s whereby a-Si:H:P accumulates as thin flakes which are fed into a storage container as a dense heap.

During the practice of the various embodiments of the invention, the phosphorous-doped a-Si particles are preferably stored under a hydrogen atmosphere maintained at a pressure of at least 6 bar.

BRIEF DESCRIPTION OF THE DRAWING

The Figures are elevated cross-sectional, somewhat schematic views of device embodiments useful in practicing the principles of the invention.

DESCRIPTION OF PREFERRED EMBODIMENT

The invention provides an improved hydrogen storage material comprised of phosphorous-doped amorphous silicon, which readily releasably absorbs and releases large volumes of hydrogen at relatively low temperatures.

It is known that the formation of an amorphous phase of silicon is favored by contaminants of silicon. When phosphorous is utilized as a contaminant or dopant for silicon, two simultaneous advantages result. The silicon more readily becomes amorphous and can releasably store more hydrogen.

In certain embodiments of the invention, phosphorous-doped a-Si (amorphous silicon) is attained from an admixture of a gaseous silicon compound and a gaseous phosphorous compound, along with hydrogen via a confined glow discharge plasma. In an exemplary embodiment of this type, a-Si:H:P is deposited in a glow-discharge plasma device by adjusting the operational parameters so that the HF-power density in the plasma chamber is in the order of magnitude of about 1 kW/m$^3$, the gas pressure is less than 10 mbar and the temperature is less than about 200° C.

In attaining the invention, it was found that decreasing deposition temperatures, with increasing HF-power and elevated gas pressures allowed significantly more hydrogen to be stored into the so-produced a-Si:H:P. It was also noted that the addition of phosphorous to a-Si increased the absorption capacity of this material for hydrogen by a factor of about 2, relative to a-Si per se produced with essentially identical production temperatures.

Cost-favorable production of large quantities of a-Si:H:P can occur with the use of silicon-containing compounds selected from the group consisting of silane (SiH$_4$), silicon tetrafluoride-hydrogen (SiF$_4$/H$_2$) mixtures, silicon tetrachloride-hydrogen (SiCl$_4$/H$_2$) mixtures, organic silicon compounds-hydrogen (RSi/H$_2$) mixtures, as well as admixtures of these compounds, with CVD (chemical-vapor-deposition) methods. During such production, at least one phosphorous-containing compound is admixed with at least one of the aforesaid silicon-containing materials, generally in a fraction of about 0.5 to 20% by volume. The phosphorous-containing compounds are preferably selected from the group consisting of phosphorous hydride (PH$_3$), phosphorous halides (PX$_3$), organic phosphorous compounds (RP) and mixtures thereof.

Figure 1:
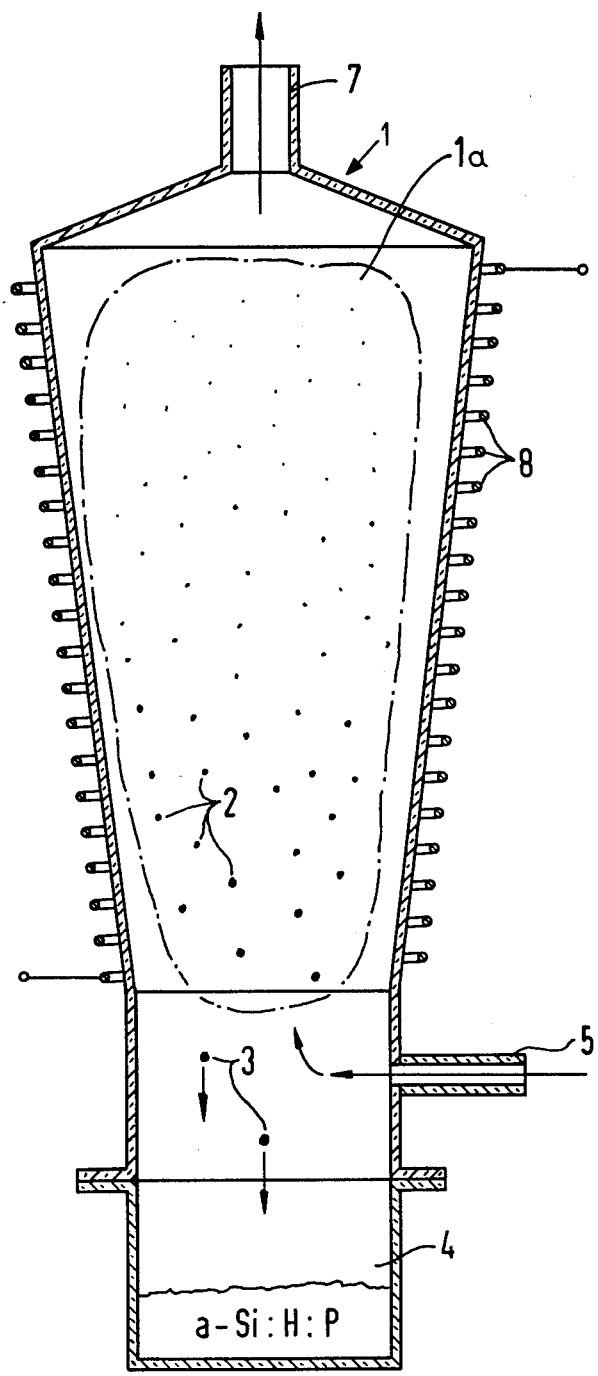
FIG. 1 is an elevated cross-sectional, somewhat schematic view of a device useful in practicing the fluidized bed embodiment of the invention.

A presently preferred method of producing the inventive hydrogen storage material via the CVD technique is with a fluidized bed method using a confined glow discharge plasma, further details of which can be derived from the device schematically illustrated in FIG. 1. The device comprises a somewhat cyclone-shaped reactor housing 1, for example composed of quartz, which includes a confined glow discharge plasma chamber 1a therein. A reservoir 4 for produced material is provided at the bottom of chamber 1a. A gas inlet 5 interconnects the chamber 1a with a controllable source of pressurized reactive gas (not shown) comprised of an admixture of a silicon-containing gas, a phosphorous-containing gas and hydrogen. A gas outlet 7 allows excess gas, mostly hydrogen, to leave chamber 1a and such gas can be recycled to inlet 5. In addition, outlet 7 can also be connected to a vacuum pump (not shown). A multi-winding induction coil 8 is provided on the exterior of housing 1 and is suitably connected to a controllable electric high-frequency (HF) source (not shown).

During operation, upon energization of coil 8 and introduction of a reactive gas stream 5a into chamber 1a, the various compounds within the reactive gas decompose and form more or less solid a-Si:H:P particles 2. These particles continue to grow within chamber 1a by continued agglomeration of material as they are being tumbled and circulated by the flowing gas stream within chamber 1a. By adjusting the reaction parameters so that a relatively high growth rate (greater than about 0.1 μm/min) and relatively low reaction temperatures (less than about 200° C.) are maintained within the chamber 1a, the produced a-Si:H:P particles contain very small cavities or fissures (so-called microvoids) which, in addition to normal accumulation of hydrogen on free valence sites in the a-Si:H:P particles, allows additional amounts of hydrogen to be stored in such cavities. By proper correlation of particle size in a desired range with the velocity of the gas stream within chamber 1a, larger particles 3 fall into a reservoir or collection tank 4. The accumulated a-Si:H:P particles can be removed continuously or discontinuously from reservoir 4 for example by flushing with a hydrogen stream. The relatively small particle size (e.g. 0.1 mm) initially resulting from the CVD process favors a rapid equilibrium establishment of hydrogen concentration during charging and discharging operations of the reservoir.

An exemplary reactive gas mixture consists of SiH$_4$ or SiCl$_4$ with about 0.5 to 5% by volume of PH$_3$.

Figure 2:
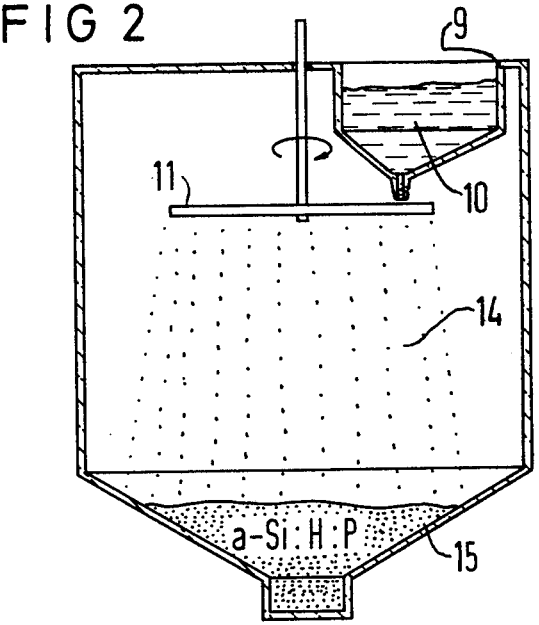
FIG. 2 is a somewhat similar view of another device useful in practicing the quenching embodiment of the invention.
Figure 3:
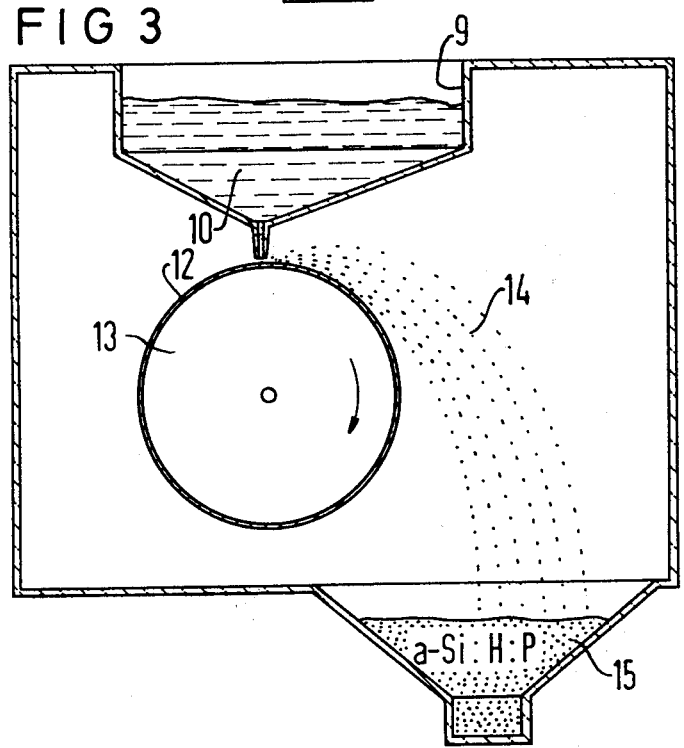
FIG. 3 is also a similar view of yet another device useful in practicing the quenching of the invention.

Another means of producing a-Si:H:P material of the invention is by relatively rapidly quenching molten silicon doped with phosphorous at a cooling rate of about 10$^7$° K./s as shown in FIGS. 2 and 3. This can occur by spraying molten silicon 10 doped with phosphorous from a melt vessel 9 onto a rotatable cooled metal impact plate 11 (see FIG. 2) or onto a cooled metal base 12 positioned on a rotatable cylinder 13 (see FIG. 3) whereby the impact plate 11 or the cylinder 13 are rotated in a hydrogen atmosphere at a speed greater than about 30 m/s. The resultant a-Si:H:P form relatively thin flakes 14 (having about a 100 μm thickness) and can be accumulated in a dense heap in a storage container 15. Also with this method, equilibrium concentrations are rapidly attained during charging and discharging of hydrogen due to the relatively small layer discharging of hydrogen due to the relatively small layer thickness of the storage material.

Through effusion and rehydrogenation experiments on a-Si:H:P material, it has been shown that hydrogen can be reversibly expelled as well as absorbed therein.

The novel storage of material of the invention, a-Si:H:P, can store large quantities of hydrogen under relatively high pressure at least about 6 bar. This hydrogen storage material is readily produced in a compact form without the necessity of a carrier material, possess no great weight and can readily release hydrogen at temperatures between room temperature and approximately 300° C. a-Si:H:P is also a material which can be produced at low cost and whose base or starting materials are available in virtually unlimited quantities.

As is apparent from the foregoing specification, the present invention is susceptible of being embodied with various alterations and modifications which may differ particularly from those that have been described in the preceeding specification and description. For this reason, it is to be fully understood that all the foregoing is intended to be merely illustrative and is not to be construed or interpreted as being restrictive or otherwise limiting of the present invention, excepting as it is set forth and defined in the hereto-appended claims.

We claim:

1. A storage material for hydrogen comprised of amorphous silicon containing phosphorous, in addition to hydrogen.

2. A storage material as defined in claim 1 wherein said material is produced from a silicon-containing gas and about 1 to 20% by volume, relative to said silicon-containing gas, of a phosphorous-containing gas.

3. A method of producing a storage material for hydrogen as defined in claim 1 comprising: admixing a silicon-containing gas with a phosphorous-containing gas and hydrogen to attain a reactive gas mixture, feeding said reactive gas mixture into a confined glow discharge plasma so that particles of amorphous silicon containing phosphorous, in addition to hydrogen are deposited in a reservoir therefor.

4. A method as defined in claim 3 wherein said confined glow discharge plasma is provided with a HF power density of about 1 kW/m$^3$ and said reactive gas mixture is maintained at a pressure less than about 10 mbar at a temperature less than about 200° C.

5. A method as defined in claim 3 wherein said silicon-containing gas is selected from the group consisting of silane (SiH$_4$), silicon tetrafluoride (SiF$_4$), silicon tetrachloride (SiCl$_4$), organic silicon compounds and mixtures thereof and said phosphorous-containing gas is selected from the group consisting of phosphorous hydride (PH$_3$), phosphorous halides, organic phosphorous compounds and mixtures thereof, said phosphorous-containing gas being present in said reactive gas mixture in an amount of about 0.5 to 5% by volume.

6. A method as defined in claim 3 wherein particle deposition occurs via a fluidized bed method whereby larger particles are separated from smaller particles by a controlled gas stream velocity which is adjusted for a desired particle size, the so-produced particles being collected in a reservoir and removed therefrom by flushing with a hydrogen gas stream and directly heaped into a storage container.

7. A method of producing a storage material for hydrogen as defined in claim 1 comprising: providing molten silicon doped with phosphorous and quenching said phosphorous-doped molten silicon at a cooling rate of about 10$^{7°}$ K./s so that particles of amorphous silicon containing phosphorous, in addition to hydrogen, are attained in a reservoir therefor.

8. A method as defined in claim 7 wherein said molten silicon doped with phosphorous is sprayed onto a cooling metal impact plate rotating at a speed greater than about 30 m/s so that relatively thin flakes of amorphous silicon containing phosphorous, in addition to hydrogen, accumulate in a storage container as a dense heap.

9. A method as defined in claim 7 wherein said molten silicon doped with phosphorous is sprayed onto a cooled metal base positioned on a cylinder rotating at a speed greater than about 30 m/s so that relatively thin flakes of amorphous silicon containing phosphorous, in addition to hydrogen, accumulate in a storage container as a dense heap.

10. A method as defined in claim 3 or 7 wherein said particles are fed into a reservoir maintained under a hydrogen pressure of at least 6 bar.

* * * * *